Oct. 20, 1970      L. ROSEN      3,535,012

RECORDING AND RECONSTRUCTING FOCUSED IMAGE HOLOGRAMS

Filed Oct. 20, 1967

LOWELL ROSEN
INVENTOR.

BY
Herbert E. Farmer
ATTORNEYS $\text{United States Patent Office}$ 3,535,012
Patented Oct. 20, 1970

3,535,012
RECORDING AND RECONSTRUCTING FOCUSED IMAGE HOLOGRAMS
Lowell Rosen, Winchester, Mass., assignor to the United States of America as represented by the Administrator of the National Aeronautics and Space Administration
Filed Oct. 20, 1967, Ser. No. 677,506
Int. Cl. G02b 27/22
U.S. Cl. 350—3.5               7 Claims

ABSTRACT OF THE DISCLOSURE

Holograms having quite unique properties are made by having the photographic plate illuminated by a light field coming from a lens-produced aerial image of a real object. This arrangement allows the aerial image to be placed as close to the hologram as desired without interfering with the reference beam and of even placing the aerial image on the plate or behind it. The resultant focused image hologram of macroscopic objects, when illuminated by a reconstruction beam, can be seen with both eyes and hence in three dimensions. Also, a non-pseudoscopic real image with minimum aberrations and useful for projection can be produced.

ORIGIN OF THE INVENTION

The invention described herein was made by an employee of the U.S. Government and may be manufactured and used by or for the Government of the United States of America for governmental purposes without the payment of any royalties thereon or therefor.

BACKGROUND OF THE INVENTION

This invention relates in general to optical systems, and more particularly, to a method and means for recording and reconstructing holograms of the aerial image of a lens which is imaging some object.

Holography is a method of image formation with optical wavefronts reconstructed by means of special photographic transparencies called holograms. Whereas conventional photography records a recognizable image of the object, holography records the reflected light waves themselves, an unrecognizable array of blobs, specks and whorls. Also, whereas the ordinary photographic film causes images of a three-dimensional scene to be collapsed into a single plane, a hologram maintains the three-dimensional properties of the image by means of a reference wave which is simultaneously recorded on the photographic film.

The technique of wavefront reconstruction, holography, had its conception in the spatial filter work of Ernest Abbe in 1896; its birth in the one-beam or on-line technique permitted by the development of the laser; and is now in its incipient adulthood.

An important advantage of a hologram over an ordinary photographic film is that a hologram records far more information, which provides a realism unattainable by any other means. Holograms are characterized by high resolution and large depth of field. The reconstructed images have several unique properties. For example, they are three-dimensional and exhibit parallax and perspective just as any solid object would. An observer can see around the image by moving his head. Also, since light from each part of the object covers the entire area of the hologram plate, any portion of the plate contains information from all of the object. Thus, if the plate were broken or blemished any small portion of it will reconstruct the object completely with only a loss in detail.

Because of these advantages holographic recording of an object has great utility in the fields of engineering, applied physics, and mathematics in a wide range of problems. For example, holograms are useful in studying moving objects such as particle density in gases and plasmas, in communication systems, in character recognition systems, as information coding devices, in interferometry, in display systems, etc.

As the technique of wavefront reconstruction is now most often used, an object is illuminated by coherent light from a laser. A photographic plate receives "unforcused" light reflected from or transmitted through the object. Also, a reference beam is incident upon the plate such that the object does not interfere with the coherent reference beam. The object-scattered waves interact with the reference waves producing fringe patterns embodying both the amplitude and the phase from the light reflected from the object. The photographic plate is then developed chemically in a conventional manner. When the hologram is placed in a coherent light beam the reconstructed wages are indistinguishable from the original waves—even though the object has long since been removed.

However, a disadvantage of the usual technique of recording a hologram with an off-axis reference beam is that placing the object very close to the hologram plate may introduce certain problems such as casting a shadow onto the plate due to the reference beam. Also, prior art emphasis on microscopic holography, with its inherent concern with microscopic objects, does not teach how a hologram of a macroscopic object can be seen with both eyes and hence in three-dimensions. The emphasis on three-dimensional "lensless" photography has made it appear that the recording of "unfocused" waves is an essential requirement for the recording of holograms. Additionally, the pseudoscopic real image from an ordinary lensless hologram is not suitable where a projected image is required because the lensless holograms have the defects of inverted relief on the projected real images.

OBJECTS AND SUMMARY OF THE INVENTION

An object of this invention is to provide a method and means for recording holograms of the aerial image of a lens which is imaging an object.

Another object of this invention is to provide a method and means for recording holograms of images placed as close to the recording medium as desired without interfering with the reference beam.

A further object of this invention is to provide apparatus utilizing large lenses for the recording of holograms which, on reconstruction, can be seen with both eyes and hence in three-dimensions.

A still further object of this invention is to provide a method and means for recording and reconstructing holograms which will provide a non-pseudoscopic real image useful for projection.

To the accomplishment of the foregoing objects, the present invention comprehends the utilization of a lens having a diameter approximately equal to the distance between the human eyes (about five inches), interposed between the object and the recording medium. Use of a high quality lens at unity magnification provides an aerial image which is essentially as good an "object" as the "real object" ahead of the lens. In this manner the aerial image can be placed as close to the hologram plate as desired without interfering with the reference beam and of even placing the aerial image on the plate or behind it. When a hologram is made by the technique of recording an aerial image falling on the side of a photographic plate toward the viewer, on reconstruction a high quality, non-pseudoscopic real image is produced which can be used for projection.

BRIEF DESCRIPTION OF THE DRAWINGS

The novel features that are considered characteristic of this invention are set forth with particularity in the appended claims. The invention, both as to its organization and mode of operation, as well as additional objectives and advantages thereof, will best be understood from the following description when read in connection with the accompanying drawings, in which:

DESCRIPTION OF THE PREFERRED EMBODIMENT

Figure 1:
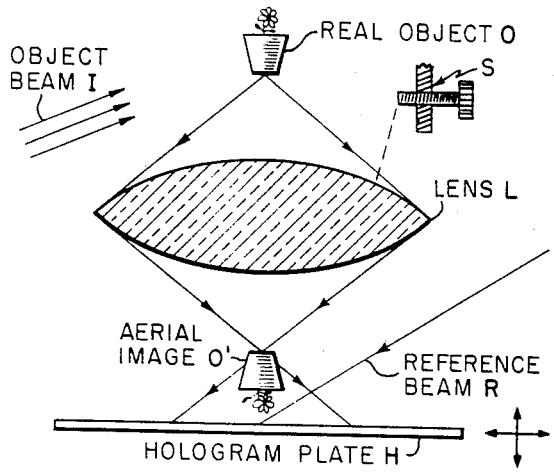
FIG. 1 is a diagram of the instant technique for recording a hologram of an aerial image falling on the side of a photographic plate away from the viewer.
Figure 2:
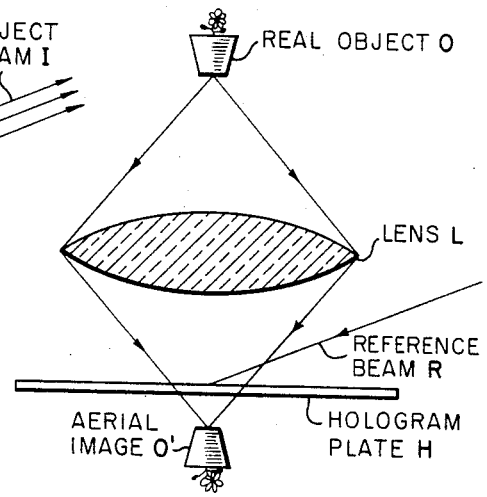
FIG. 2 is a diagram of the instant technique for recording a hologram of an aerial image falling on the side of the photographic plate toward the viewer.

Shown in FIG. 1 is a diagram illustrating the instant wavefront reconstruction imaging technique by which a hologram can be made having quite unique properties. As shown in FIG. 1, an object O is illuminated by an object illuminating beam I which may typically be 6328 A. laser light from a helium-neon pulsed or continuous wave gas laser. Obviously, other types of coherent light sources may be used. A reference beam R illuminates a hologram plate H. Reference beam R may be any conventional off-axis, plane-wave or spehical wave, point source reference beam having the same monochromatic wave length as the object beam wave length. Or beam R may be an extended coherent reference source formed by interposing a diffusing medium between the laser point source and the hologram plate H. A lens L receives light reflected from the real object O and forms an aerial image O' which acts as the object the holographic plate H is recording. By using a high quality lens which is set up for unity magnification to minimize distortion, the aerial image O' is essentially as good an object as the real object ahead of the lens. However, other degrees of magnification can be employed. This arrangement has the advantage of allowing the aerial image to be placed as close to the hologram plate H as desired without interfering with the reference beam R and of even placing the aerial image on the plate H or behind it (FIG. 2). It is to be understood that any suitable means may be provided for moving either the lens L or the plate H. For example, shown in FIG. 1 is an adjusting means S comprising a knurled screw threaded through a fixed plate. The end of the screw is coupled by any convenient means to the lens L.

Figure 4:
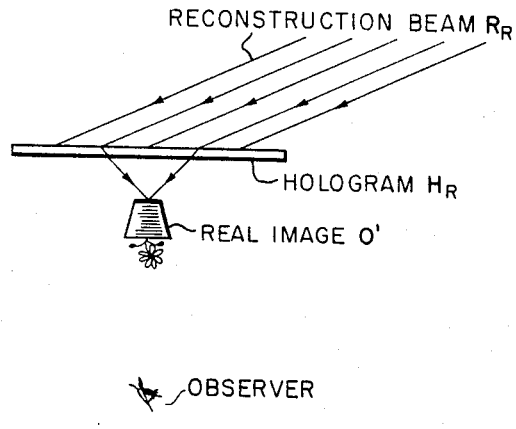
FIG. 4 is a diagram illustrating the reconstruction of an aerial image hologram on which the original aerial image was formed on the side of the photographic plate toward the viewer.
Figure 5:
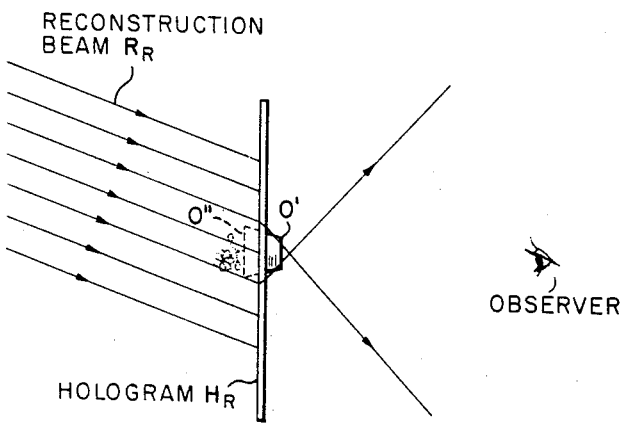
FIG. 5 is a diagram illustrating the reconstruction of a hologram on which the original aerial image straddled the photographic plate.

After the proper exposure time, the holographic plate H, which may typically be a 4 by 5 inch plate having a Kodak 649F emulsion, is then developed chemically in a conventional manner. The developed hologram is then reconstructed using a reconstruction beam $R_R$ as shown in FIGS. 4 and 5.

Regarding the geometrical characteristics of the lens, the lens should preferably be as large as the hologram (4 by 5 inches) so that both eyes can be used to view the hologram. Moreover, the lens should be reasonably fast, meaning that its focal length divided by its diameter should be as small as possible consistant with obtaining parallax when the observer moves his head from side to side to view the reconstructed image. Typically, a focal ratio faster than $f/2$ is sufficient to provide the effect of parallax when viewing the reconstructed hologram image.

FIG. 2 illustrates the recording of a hologram of an aerial image falling on the side of the photographic plate toward the viewer. This focusing is accomplished by proper positioning of either the hologram plate H or the lens L.

By way of further understanding what happens in the embodiment shown in FIG. 2, recall that a hologram records a complex wavefront regardless of whether it is diverging (as in a conventional situation where a real object is in front of the plate) or converging (as when an aerial image is behind or on the plate). Thus, when the hologram made by the technique shown in FIG. 2 is reconstructed as shown in FIG. 4, a high quality, nonpseudoscopic real image in front of the hologram is produced rather than a high quality virtual image in back of the hologram.

Figure 3:
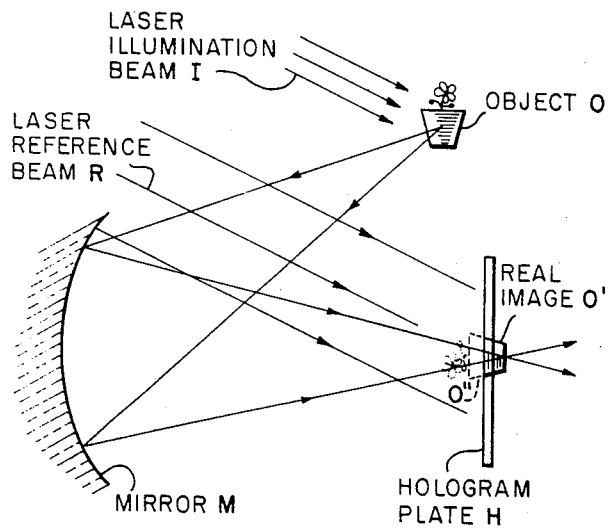
FIG. 3 is a diagram of the instant technique for recording a hologram of an aerial image straddling the photographic plate.

FIG. 3 illustrates an alternative embodiment utilizing a parabolic mirror M, which preferably has a diameter of 5 to 10 inches. The mirror M or the hologram plate H is positioned such that the image of the object apparently straddles the hologram plate. An illustration of the image reconstructed from this type of straddling hologram (produced by either mirrors or lenses) is shown in FIG. 5. That part of the image appearing on one side of the plate is a virtual image O' and that part of the image appearing on the other side of the hologram plate is a real image O'—an unusual situation.

It is important to note that the focused image holographic technique is versatile enough so that the coherent reference source, which would normally be a point source, can now be spread out into an extended coherent source and still not degrade the hologram quality to any great extent. The reason this is so is that the focused real image used as an object in the recording process is much closer to the hologram plate than the extended reference source. This condition gives rise to a coherent electromagnetic wavefront from the real image having a greater curvature than the coherent electromagnetic wavefront, from the extended reference source, at the photographic plate. When both the wavefront from the reference beam and the object beam mix at the photographic plate the curvature of the resulting combination wavefront is influenced only slightly by the extended reference source wavefront. On reconstruction, the same or a different coherent extended source, a point coherent source or even an incoherent source can be used.

Accordingly, there has been shown and described herein a novel, useful and improved apparatus for allowing holograms to be made of the aerial image of a lens which is imaging some object.

A feature of the invention is that it now becomes possible to restore the third-dimension information in the recording of conventionally focused photographs, in a conventional photographic arrangement, simply by adding a coherent background wave to an otherwise conventionally focused image, which may or may not straddle the plate.

A further feature of the invention is the teaching that use of large lenses to produce aerial images of macroscopic objects presents a three-dimensional image which can be seen on reconstruction without any need for a microscope.

Another feature of the invention is that placement of the aerial image of the lens behind the photographic plate during the recording process results in a good quality nonpseudoscopic image useful for projection and free from the usual defects (such as the "inside-out" image inversion effect) of the pseudoscopic real image from an ordinary lenseless hologram. Thus, the invention can be used where a projected image is required of the hologram instead of a virtual image.

Still another feature of the invention is that it now becomes possible to place a three-dimensional aerial image as close to the photographic plate as desired without interfering with the reference beam.

And still another feature of the invention is the teaching that a hologram can be produced having a high quality image of the object apparently straddling the hologram, that part of the image appearing on one side of the plate being a virtual image and that part of the image as close to the photographic plate as desired with real image.

The specific embodiment herein described is intended to be merely illustrative and not restrictive of the invention. Various modifications in changes in form and detail will be obvious to those skilled in the art. Alternative embodiments of this invention can consists of lens systems, mirror systems or multi-lens arrays in place of the single lens or mirror. For example, high quality holograms have been obtained using a pair of plano-convex lenses (5 inch diameter and 7 inch focal length) placed back to back with their convex sides touching. It is therefore intended in the appended claims to cover all such changes and modifications as fall within the true spirit and scope of the invention.

What is claimed:

1. Apparatus for recording holograms of an object comprising:
    means for illuminating said object with a point source of coherent electromagnetic radiation to produce an object beam,
    a rectangular-shaped solid recording medium,
    large aperture optical means disposed between said object and said recording medium for forming an aerial image of said object in the near field of said recording medium, said recording medium being responsive to electromagnetic wavefronts constituting said aerial image,
    said optical means having an optical aperture no smaller than both the spacing between human eyes and the optically responsive physical dimensions of said recording medium, and having an aperture ratio sufficient to provide the effect of parallax,
    and means for illuminating said recording medium with a reference beam mutually coherent with said object beam along an axis angularly displaced with respect to the axis of the object beam at the recording medium.

2. The apparatus as defined in claim 1 wherein said optical means comprises a lens system having an optical aperture substantially equivalent to the spacing between human eyes.

3. The apparatus as defined in claim 1 wherein said optical means comprises a mirror system having an optical aperture of between one to two times the optically responsive length of said recording medium.

4. The apparatus as defined in claim 1 wherein said aerial image is focused in the near field to fall on the side of said recording medium away from a viewer.

5. The apparatus as defined in claim 1 wherein said aerial image is focused in the near field to fall on the side of said recording medium toward a viewer to provide a nonpseudoscopic real image suitable for projection when said recording medium is reconstructed.

6. The apparatus as defined in claim 1 wherein said aerial image is focused in the near field to straddle said recording medium to provide on reconstruction a virtual image on one side of said recording medium and a real image on the other side of said recording medium.

7. The apparatus as defined in claim 1 wherein the optically responsive physical dimensions of said recording medium are substantially equal to the dimensions of said aperture of said optical means.

References Cited

Haine et al., Nature, vol. 166, No. 4216, August 1950, pp. 315–316.

Van Ligten et al., Nature, vol. 211, No. 5046, July 1966, pp. 282–283.

Stroke et al., Physics Letters, vol. 20, No. 4, March 1966, pp. 368–370.

Stroke, Physics Letters, vol. 23, No. 5, October 1966, pp. 325–327.

Leith et al., Jour. of the Optical Soc. of Am., vol. 53, No. 12, December 1963, pp. 1377–1381.

DAVID SCHONBERG, Primary Examiner

R. J. STERN, Assistant Examiner